(12) United States Patent
Degertekin et al.

(10) Patent No.: US 6,567,572 B2
(45) Date of Patent: May 20, 2003

(54) OPTICAL DISPLACEMENT SENSOR

(75) Inventors: Fahrettin Levent Degertekin, Atlanta, GA (US); Goksen G. Yaralioglu, Palo Alto, CA (US); Butrus Thomas Khuri-Yakub, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/896,889

(22) Filed: Jun. 28, 2001

(65) Prior Publication Data

US 2002/0039463 A1 Apr. 4, 2002

Related U.S. Application Data

(60) Provisional application No. 60/214,884, filed on Jun. 28, 2000.

(51) Int. Cl.[7] ................................................. G02B 6/26
(52) U.S. Cl. ............................ 385/12; 385/13; 250/237
(58) Field of Search ............................... 385/12, 13, 37, 385/25, 26, 20, 21, 22, 16, 17, 36

(56) References Cited

U.S. PATENT DOCUMENTS

| | | | | |
|---|---|---|---|---|
| 4,293,188 A | * | 10/1981 | McMahon | 250/227.21 |
| 5,200,610 A | * | 4/1993 | Zuckerwar et al. | 250/227.21 |
| 5,311,360 A | | 5/1994 | Bloom et al. | 359/572 |
| 5,339,289 A | * | 8/1994 | Erickson | 359/212 |
| 5,680,211 A | * | 10/1997 | Kaneda et al. | 250/231.17 |
| 5,908,981 A | | 6/1999 | Atalar et al. | 73/105 |
| 5,909,280 A | * | 6/1999 | Zavracky | 356/454 |
| 5,995,229 A | * | 11/1999 | Omi | 33/707 |
| 6,486,467 B1 | * | 11/2002 | Speckbacher et al. | 250/237 G |

* cited by examiner

Primary Examiner—John D. Lee
Assistant Examiner—Daniel Valencia
(74) Attorney, Agent, or Firm—Lumen Intellectual Property Services, Inc.

(57) ABSTRACT

An optical displacement sensor is provided for optically measuring the static and dynamic displacement of one or more reflectors that can be integrated in electronics and optics applications. The sensor includes an optically transparent substrate and a reflective grating deposited on the substrate. A light source provides optical illumination on the reflector through the substrate and the reflective grating. The reflector is positioned over the substrate and over the reflective grating. Furthermore, one or more photo-detectors are included to monitor reflected and diffracted light from the reflector and the reflective grating. The position of the reflector can be adjusted by applying at least one DC voltage. An AC signal could be added to at least one DC bias voltage for calibration of the sensor. The present invention also includes an array of reflectors as well as a transmission grating to deflect the optical illumination to the array of reflectors.

30 Claims, 5 Drawing Sheets

OPTICAL DISPLACEMENT SENSOR

CROSS-REFERENCE TO RELATED APPLICATIONS

This application is cross-referenced to and claims priority from U.S. Provisional Application No. 60/214,884 filed Jun. 28, 2000, which is hereby incorporated by reference.

FIELD OF INVENTION

This invention relates generally to pressure sensitive devices and optical interferometry. More particularly, it relates to diffraction-based systems and methods for optically detecting displacement of reflectors or membranes in various applications and use of displacement of reflectors or membranes for optical and ultrasonic signal transmission.

BACKGROUND

Optical interferometry is commonly used to detect small displacements over a large frequency range. Standard implementations of this method can be very bulky due to the large optical components such as beam-splitters, mirrors, lenses etc. A micro-machined phase sensitive diffraction grating can provide the same displacement sensitivity with a much simpler and compact structure. An example of such a diffraction grating formed on an atomic force microscopy (AFM) cantilever has been shown to have thermal mechanical noise limited displacement sensitivity. Examples are, for instance, provided by S. R. Manalis, S. C. Minne, A. Atalar and C. F. Quate, in a paper entitled "Interdigital cantilevers for atomic force microscopy," published in *Appl. Phys. Lett.*, 69, pp. 3944–6, 1996 and G. G. Yaralioglu, A. Atalar, S. R. Manalis and C. F. Quate, in a paper entitled "Analysis and design of an interdigital cantilever as a displacement sensor," published in *J. Appl. Phys.*, 83, pp. 7705–15, 1998 as well as U.S. Pat. No. 5,908,981 to Atalar et al.

The prior art teaches a scanning electron microscope of an interdigital AFM cantilever where the interdigital fingers form a diffraction grating. In this configuration, the interdigital fingers connected to the wide center beam form the non-moving reference. The other fingers are connected to the outer arms and to the AFM tip. A laser is used to illuminate the interdigital fingers and the intensities of the reflected diffraction orders are measured at fixed positions determined by the geometry of the grating. The grating and reflector are mechanically coupled. When a force is applied to the tip, the moving fingers connected to the tip are displaced relative to the non-moving reference fingers. This alters the phase relation between the light reflected from the adjacent fingers and the intensity of the diffraction order is changed. Monitoring the intensity of the light at those pre-determined locations gives the relative displacement of the fingers. Experimental results show that this method can be used to detect displacements from DC to 10s of MHz, membrane response being the limit as discussed by O. Solgaard, F. S. A. Sandejas and D. M. Bloom in a paper entitled "Deformable grating optical modulator," published in *Opt. Lett.*, 17, pp. 688–90, 1992. U.S. Pat. No. 5,311,360 to Bloom et al. discusses a method and apparatus for modulating a light beam. Bloom et al. teaches a modulator for modulating an incident beam of light wherein the modulator includes a plurality of equally spaced-apart elements. Each element includes a reflective planar surface. The elements are arranged parallel to each other with their light-reflective surfaces parallel to each other. The modulator includes means for supporting the elements in relation to one another and means for moving particular ones of the elements relative to others so that the moved elements transit between the first configuration wherein the modulator acts to reflect the incident beam of light as a planar mirror, and a second configuration wherein the modulator diffracts the light reflected therefrom. In operation the light-reflective surfaces of the elements remain parallel to each other in both the first and second configurations. The perpendicular spacing between the reflective surfaces of the respective elements is equal to m/4×the wavelength of the incident beam of light, wherein m equals an even whole number or zero when the elements are in the first configuration and m equals an odd whole number when the elements are in the second configuration. The apparatus and method by Bloom et al. teaches a modulator of light, but does not provide for a measurement system.

There is a need for micro-machined optical displacement sensors that are simpler and more compact than optical displacement sensors taught in the prior art to optically measure static and dynamic displacements of reflectors or membranes.

SUMMARY OF THE INVENTION

The present invention provides an apparatus and method of an optical displacement sensor for measuring displacement of a reflector. The optical displacement sensor includes an optically transparent substrate and a reflective grating deposited on the substrate. The present invention further includes a light source to provide optical illumination on the reflector through the substrate and the reflective grating. The reflector is positioned at a vertical distance that is substantially less than half the coherence length of the light source over and with respect to the substrate and the reflective grating. In addition, the reflector is positioned substantially parallel to the substrate and the reflective grating to allow the optical illumination on the reflector to go through the substrate and reflective grating and reflect back through the reflective grating. Furthermore, the present invention includes one or more photo-detectors to monitor reflected and diffracted light from the reflector and the reflective grating.

The optical displacement sensor of the present invention includes various types of reflectors which are chosen dependent on the desired application. In a preferred embodiment of the present invention, the reflector is a flexible and optically reflective membrane. The reflective grating is formed by non-moving fingers and are not located on the same structure as the reflector. The light source is a coherent light source and can, for instance, be a semiconductor laser or from an optical fiber. Furthermore, in another embodiment of the present invention, the photodetectors can be replaced by one or more optical fibers. The substrate is transparent at a selected wavelength of the optical illumination for a particular application and light source. The position of the reflector to a desired location can be adjusted by applying at least one DC voltage between the substrate and the reflector. The DC voltage could be applied to the non-moving fingers of the reflective grating. Furthermore, the present invention includes an AC signal to be added to at least one DC bias voltage for calibration of the optical displacement sensor. The optical displacement sensor of the present invention further includes a wafer with at least one aperture for light transmission. The wafer hosts, for instance, but not limited to, one or more amplifiers and one or more photodetectors. In another embodiment of the present invention, the optical displacement sensor further includes an array of reflectors with at least one other reflector positioned at a vertical distance that is substantially less than half the coherence length of the light source over and with respect to at least one other reflective grating and the substrate. In this embodiment, the optical displacement sensor includes a transmission grating to deflect the optical illumination to the array of reflectors. Furthermore, the optical displacement sensor includes the possibility that each element in the array of reflectors is illuminated at a separate wavelength and multiplexed to a single optical fiber.

In view of that which is stated above, it is the objective of the present invention to provide an optical displacement sensor to measure static and dynamic displacement of one or more reflectors.

It is another objective of the present invention to provide an optical displacement sensor wherein the reflector and diffraction grating are not on the same structure.

It is yet another objective of the present invention to provide an optical displacement sensor that allows one to integrate different type of reflectors.

It is still another objective of the present invention to provide an optical displacement sensor amenable to integration of electronics and optics to form compact displacement detectors for a single reflector or reflectors fabricated in the form of arrays It is still another objective of the present invention to provide an optical displacement sensor to operate in a broad frequency range.

It is still another objective of the present invention to provide an optical displacement sensor that could be used as a receiver or as a transmitter.

It is still another objective of the present invention to provide an optical displacement sensor wherein the position of the reflector can be adjusted to a desired location by applying a DC voltage.

It is still another objective of the present invention to provide an optical displacement sensor that can be calibrated using an AC signal.

It is still another objective of the present invention to provide an optical signal combiner wherein the position of desired reflectors are adjusted by applying DC and AC signals to deflect a certain wavelength of incident light to a desired location.

The advantage of the present invention over the prior art is that the present invention provides for simple and compact optical displacement sensors that optically measures the static and dynamic displacement of one or more reflectors. Another advantage of the present invention is that the reflector and diffraction grating are not, as is the case in the prior art, located on the same structure. The present invention can be integrated in a wide variety of electronics and optics applications to form compact displacement detectors for a single reflector or reflectors fabricated in the form of arrays.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention.

The present invention provides a sensitive diffraction based optical displacement apparatus and method to measure the static and dynamic displacement of reflectors in various applications. The present invention of an optical displacement sensor includes the use of any type of reflector, however, in a preferred embodiment, the present invention includes a flexible and optically reflective membrane. The apparatus and method of the present invention is amenable to integration of electronics and optics to form compact displacement detectors for a single membrane or membranes fabricated in the form of arrays. Typical applications of the present invention would be in, for instance, but not limited to, microphones (micro-machined or not), micro-machined ultrasonic transducers, micro-machined ultrasonic wave generators, micro-machined ultrasonic image applications, pressure sensors and hearing aids. The present invention would also be useful in any sensing application where the position of a reflector or membrane is changed due to a chemical or physical process and this displacement needs to be measured accurately in a broad frequency range. It is important to note that the reflector in the present invention is not mechanically coupled to the grating, or is not located on the same structure as the grating, which enables one to easily include any type of reflector and make the present invention useful for a wide variety of applications. By way of illustration, rather than being restrictive, the description below will discuss in more detail the present invention in relation to the microphone application.

Figure 1A:
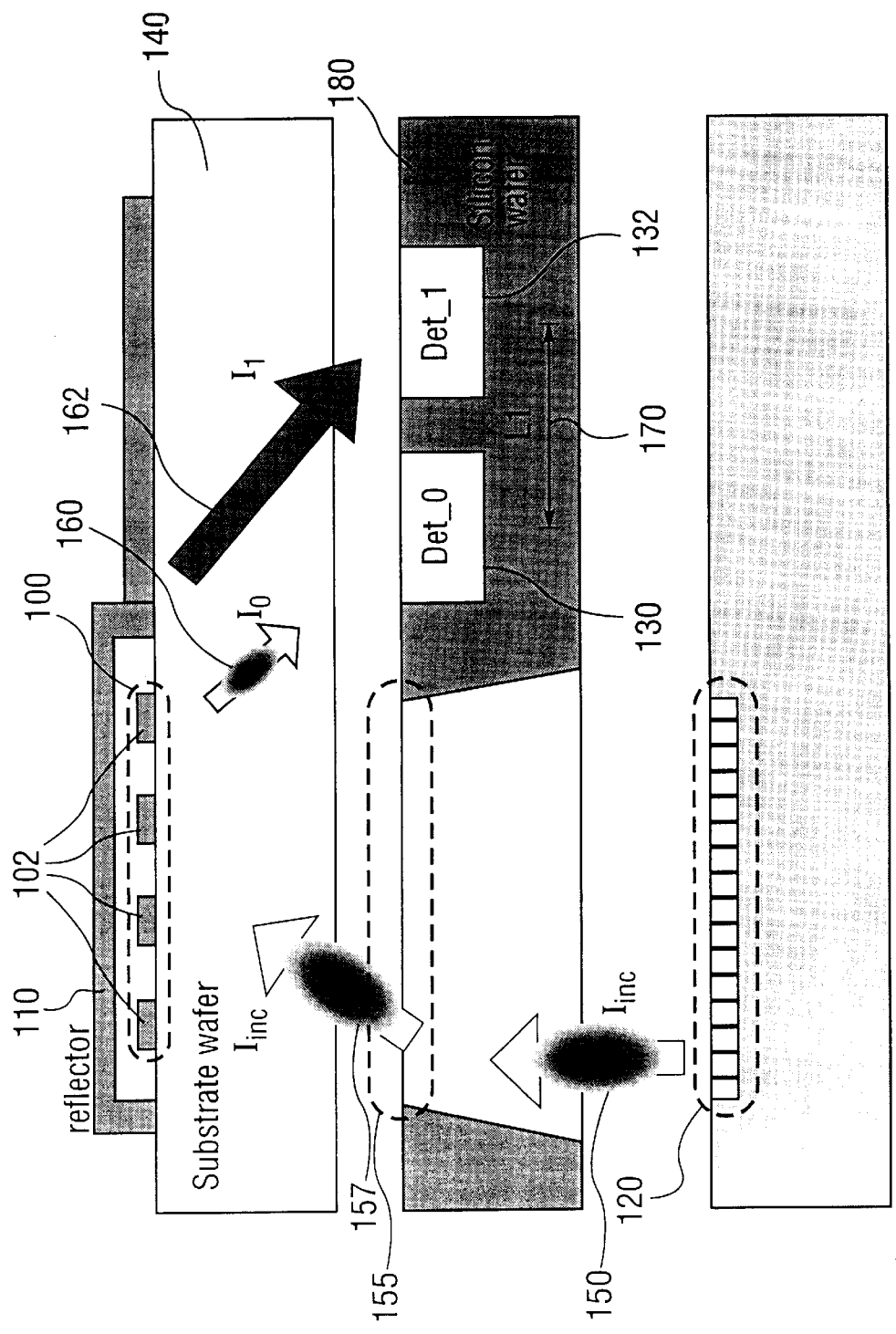
FIGS. 1A and 1B provides a schematic diagram of an optical displacement sensor according to the present invention.
Figure 1B:
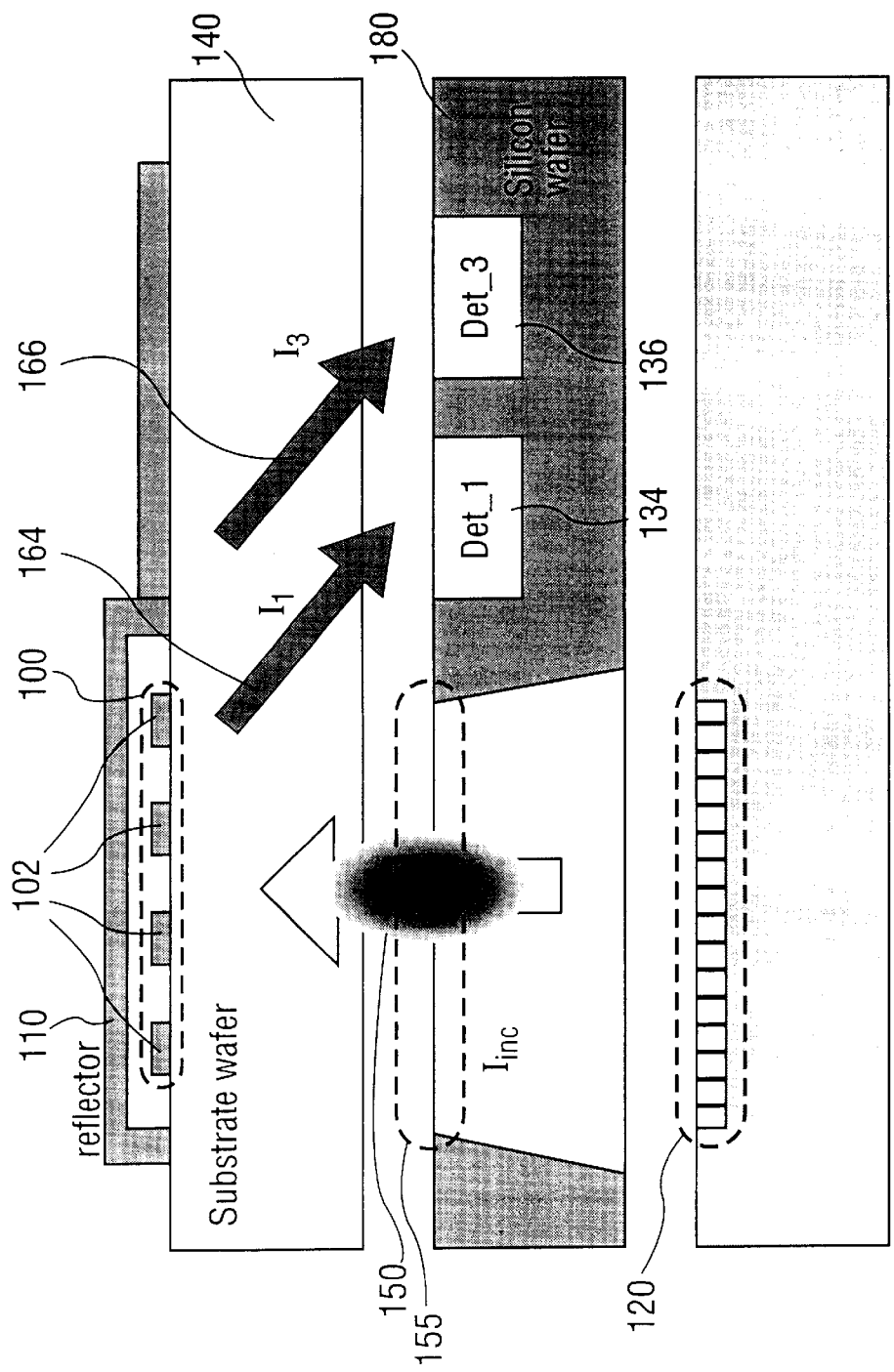

FIG. 1 shows a schematic diagram of an integrated microphone using the diffraction based optical displacement measurement system and method 10. As shown in FIG. 1, the present invention provides for the use of a phase sensitive diffraction grating—the phase sensitive diffraction grating is formed by reflector 110 and reflective grating 100 on substrate 140—to measure the displacement of a membrane structure 110 and methods of fabricating sensitive microphones. Reflector or membrane structure 110 is integrated with a light source 120 and one or more photodetectors 130 and 132, in FIG. 1A and 134 and 136 in FIG. 1B. The present invention is not limited to the number of photodetectors. In addition, the present invention includes another embodiment where the photodetectors are one or more optical fibers. Light source 120 is any type of coherent light source such as, for instance, but not limited to, a semiconductor laser or from an optical fiber. The main part of system 10 includes a flexible optically reflective membrane 110 suspended on a non-moving, transparent substrate 140. For displacement detection, the intensity of the light 150 from light source 120 reflected from the micro-machined phase sensitive diffraction grating 100 is monitored. Grating 100 includes periodic reflective fingers 102 deposited over optically transparent substrate 140 and reflective microphone membrane 110 formed on substrate 140 surface. Displacement of membrane 110 changes the intensity of the diffraction orders 160, 162 as shown in FIG. 1A or 164, 166 as shown in FIG. 1B, which can be easily detected using standard photodetectors 130, 132 as shown in FIG. 1A and 134, 136 as shown in FIG. 1B. This provides the sensitivity of an optical interferometer, and has a better noise performance as compared to other intensity based commercial optical microphones. Light source 120 provides optical illumination 150 through substrate 140 to reflector or membrane 110. Dependent upon where optical illumination 150 enters aperture 155, optical illumination 150 will be deflected in aperture 155 to have an angle of incidence 157 as shown in FIG. 1A. As shown in FIG. 1B no deflection of optical illumination 150 occurs in aperture 155. In FIG. 1B, optical illumination 150 comes in perpendicular and only higher order modes are used for detection. Reflector or membrane 110 is positioned vertically to reflective grating 100 closer than half the coherence length of light source 120. In addition, the apparatus and method 10 could include wafer 180, preferably a silicon wafer, that has at least one aperture for light 150 transmission and possibilities to host, for instance, amplifiers and/or detectors 130, 132, 134, and 136.

In the present invention, a microphone membrane is used as moving reflector 110 and conductive grating 100 is deposited over rigid substrate 140 as the non-moving reference reflector. Light source 120, photodetectors 130, 132, 134, and 136 and electronics can be integrated to this substrate 140 to form a fully integrated microphone 10 or microphone array (as discussed below). Substrate 140 is transparent to light incident 150 from the backside. Substrate 140 can be made of silicon if the wavelength is judiciously chosen. Upon reflection of incident light 150, many diffraction orders 160, 162, 164 and 166 are generated. One can use any one or a pair of these diffraction order intensities to measure displacement. The difference signal is considered between the zeroth and first orders reducing the laser intensity noise. Some of the zeroth order light with intensity $I_0$ 160 is directed to the detector Det_0 130. Detector Det_1 132 detects the intensity of the first diffraction order, $I_1$ 162. The distance of the first diffraction order, L1 170, from the zeroth order and the beam width, W, at a normal observation distance, D, are given by:

$$W = \lambda D / (N d_{gr})$$

$$L1 = \lambda D / d_{gr}$$

where $\lambda$ is the optical wavelength, D is the normal distance to observation plane, N is the number of fingers 102 illuminated and $d_{gr}$ is the spatial period of the reference fingers on substrate 140. Given the wavelength and the observation distance, these values can be adjusted by simple lithography to prevent total internal reflections and to have suitable order separation. The variation of the reflected diffraction orders with the vertical gap thickness between grating 100 and reflective membrane 110 can be determined by considering the interference of the light reflected from these two surfaces. When grating 100 is illuminated from the back side through the transparent substrate, a first part of incident light 150 is reflected from non-moving reference fingers 102 on substrate 140 and second part of it passes through the grating and is reflected from the reflector 110. Since reflector 110 is placed substantially parallel to substrate 140, the second part of the light is reflected and is able to pass through grating 100 for the second time and has a phase delay with respect to the first part of the light. There will be interference between these two parts at the substrate plane because the gap thickness between substrate 140 and reflector 110 is chosen to be less than half the coherence length of the incident light. This interference determines the diffraction pattern at the detector plane. For example, when the gap thickness is a multiple of $\lambda/2$, the first and second parts of the reflected light interfere constructively and the reflection from grating 100 is like that of a flat mirror maximizing the intensity of the zeroth order. In contrast, when the gap thickness is an odd multiple of $\lambda/4$, there is destructive interference between the two parts and the intensity of the odd orders is maximized while the intensity of the zeroth order is minimized. The detailed analysis of this diffraction field can be performed using well-known calculation methods and shows the validity of the above explanation. Fourier analysis of the far field diffracted pattern shows that the diffraction order intensities are related to the gap thickness d by the relations $$I_0 \propto \cos^2\left(\frac{2\pi}{\lambda}d\right) \text{ and } I_1 \propto \sin^2\left(\frac{2\pi}{\lambda}d\right).$$

If one uses the difference of the output currents from the detectors and bias the gap to an odd multiple of $\lambda/8$, one can obtain the output current due to small deflections $\lambda x$ as $$i \propto I_0 - I_1 \propto IR\frac{4\pi}{\lambda}\Delta x \sin\left(\frac{4\pi}{\lambda}d_0\right) = IR\frac{4\pi}{\lambda}\Delta x \text{ when } d_0 = n\frac{\lambda}{8}, n \text{ odd.} \quad (1)$$

Here R denotes the responsivity of the detector and I is the light intensity. The output current depends on the frequency of the incident light rather than the frequency of the sound wave, so the microphone can be operated from DC to GHz range with high displacement sensitivity.

In order to realize a sensitive microphone one should have a compliant membrane, which can be displaced by pressure fields and a detection scheme to detect membrane displacements at the pressure levels in the order of $10^{-5}$Pa. The pressure equivalent of the thermal mechanical noise of the membrane structure should be small since this number determines the minimum detectable pressure level. A broadband microphone requires a membrane response free of resonances in the bandwidth of interest and a broadband detection scheme. The micro-machined microphone membrane and the integrated optical detection scheme satisfy these requirements. It can also transmit sound and can be self-calibrating by the application of bias voltages between the substrate and the membrane. In the following description, the elements and operation of the microphone are discussed in detail.

Diffraction Based Optical Displacement Detection

The microphone structure of the present invention forms a phase sensitive optical diffraction grating, in which the diffraction pattern is determined by the membrane displacement. The apparatus and method of the present invention uses the substrate with reference fingers and the motion of the membrane changes the diffraction pattern. The incident light will be reflected back to the zeroth order when the gap thickness is an integer multiple of $\lambda/2$, and to the odd diffraction orders when the gap thickness is an odd multiple of $\lambda/4$.

The detailed diffraction pattern of such a structure can be found by applying standard diffraction theory to determine the locations and the dimensions of the photodetectors. As an example, one could consider a HeNe laser ($\lambda$=632 nm) illuminating a membrane through a diffraction grating with 10 reference fingers (N=10) with $d_g$=2 $\mu$m. As expected, the zeroth-order reflected beam is sent predominantly into the first order diffraction fields and a small amount to the third order when d=$\lambda$/4. When the gap thickness is $\lambda$/8, both the zeroth and first orders are present. In this analysis, it is assumed that the light is incident at a normal angle to the diffraction grating. For practical cases, it is difficult to illuminate the grating at normal incidence and there may be a small incidence angle, Φ. To include this effect, the displacement values should be scaled by cos(Φ). This angle should be kept small in order to maximize the sensitivity.

Figure 2:
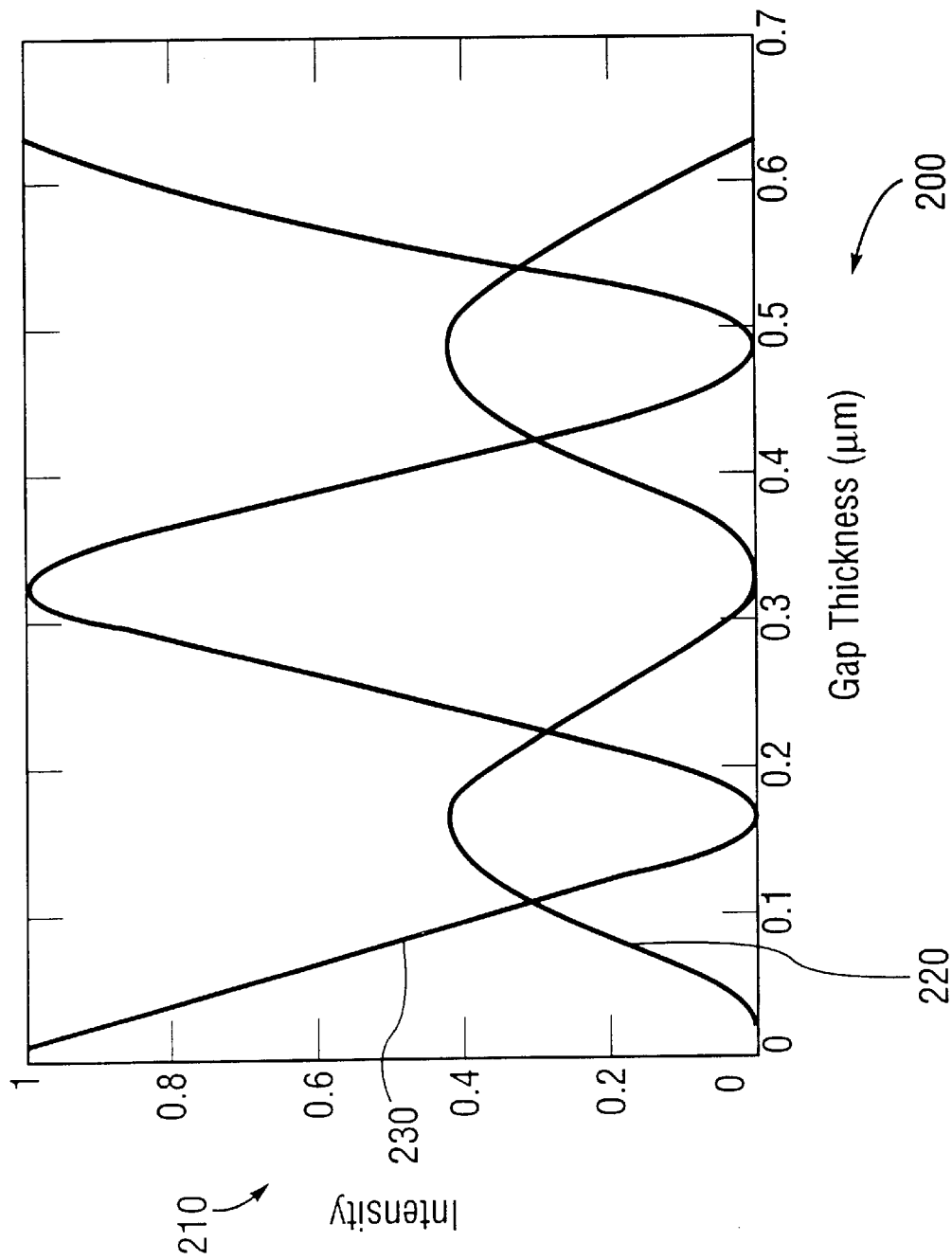
FIG. 2 provides an example of the variation of the zeroth and first diffraction orders with gap thickness at an observation of 1 mm from the diffraction grating for lambda is 632 nm.

The intensity 210 of these orders 220 and 230 (zeroth and first respectively) as a function of gap thickness 200 shows the $\cos^2(2\pi d/\lambda)$ and $\sin^2(2\pi d/\lambda)$ variation as shown in FIG. 2. By placing a 100 μm wide photodetector at either x=0 or x=300μm and biasing the gap to an odd multiple of λ/8, one can obtain a signal maximally sensitive to the membrane displacement, resulting in a sensitive microphone. The output signal of the photodetectors does not depend on the frequency of the acoustic signal and the sensitivity is determined by the wavelength of the light. Hence, the bandwidth of the detection scheme depends only on the speed of the photodetectors and the following electronics. These devices can be used up to GHz range with appropriate electronics. The final signal level at the output of the microphone will be determined by the resistor value used in the feedback loop of transimpedance amplifier which converts the photodetector current to output voltage.

When a single photodetector is used to detect the intensity of a diffraction order the output signal will include the effect of laser intensity noise degrading the performance of the microphone. This noise can be eliminated by normalizing the output signal with the laser output power. A detailed analysis of the detection scheme of the present invention shows that for the two-detector scheme the noise at the output of this microphone will be dominated by the shot noise at the optical detectors. For typical detectors the displacement equivalent value of this noise will be around $1 \times 10^{-5} \text{Å}/\sqrt{Hz}$. This is adequate to detect 0 dB SPL pressure levels in the DC-400kHz range for the membrane. Using arrays of these membranes to form the microphones, this noise level will be further reduced by spatial averaging.

As shown in FIG. 2, the intensity of the orders 210 is a periodic function of the gap thickness 200. This is an advantage, since gap thickness 200 is not a critical parameter for the detection method in contrast to capacitive detection methods. Gap 200 can be made large to accommodate large static ambient pressure variations. Prevention of membrane collapse also increases the dynamic range. The gap can be made as long as half the spatial coherence of the incident light.

Direction Sensing

Figure 3:
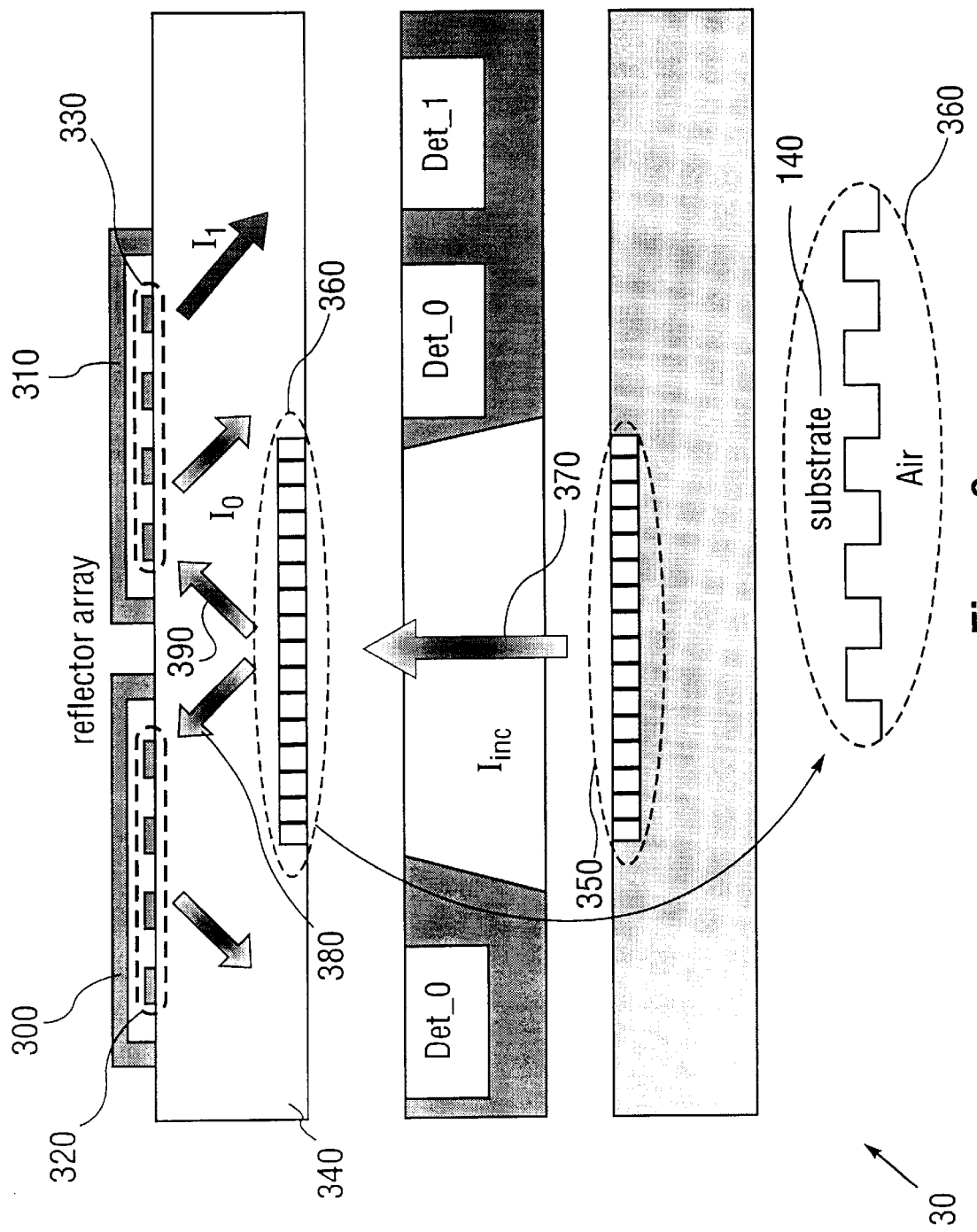
FIG. 3 provides a schematic of a microphone membrane integrated with an optoelectronic readout with transmission diffraction grating.

The microphone structure of the present invention can be easily micro-machined in the form of an array to determine the direction of an incoming acoustic wave as shown by an exemplary embodiment in FIG 3. In general, FIG. 3 shows the same structure and elements as in FIG. 1, but now FIG. 3 also shows the microphone structure 30 of the present invention including an array of reflectors 300 and 310. The array of the present invention is not limited to the number and type of reflectors as show in structure 30. In a preferred embodiment, the array of reflectors could be an array of membranes. The position of each reflector is again positioned at a vertical distance that is substantially less than half the coherence length of the light source 350 with respect to and positioned over a reflective grating, such as 320 and 330, and over substrate 340. Structure 30 further includes a transmission grating 360 to deflect optical illumination 370 to the array of reflectors 300 and 310 with deflected optical illumination 380 and 390. Transmission grating 360 basically functions as a beam splitter and can be any device that serves this purpose.

One can derive the difference signal between the two elements of the microphone array due to an acoustic wave incident at angle θ with the normal direction. It is assumed that the array elements are separated by a distance D and the membrane displacements have the form $$d_1(t) = \frac{\lambda}{8} + \Delta x \sin(\omega_a t) \text{ and } d_2(t) = \frac{\lambda}{8} + \Delta x \sin(\omega_a(t - \Delta t))$$

where $\omega_a$ is the angular frequency of the acoustic signal and the gap thickness is biased for maximum sensitivity. Δt=D sin θ/c is the time delay between the arrival times of the acoustic signal, where c is the speed of sound in air. With the small displacement approximation, the direction signal s(t) can be written as $$s(t) = s_1(t) - s_2(t) \cong IR \frac{4\pi}{\lambda} \Delta x \cos(\omega_a t) \frac{2\pi D \sin(\theta)}{\lambda_a} \text{ where } s_1(t) = IR \frac{4\pi}{\lambda} \Delta x \sin(\omega_a t) \quad (2)$$

The regular detector signal $s_1(t)$ is found using Eq. 1, and $\lambda_a$ is the wavelength of the acoustic wave. From the expression above, one can see that the output of the direction sensing system is proportional to the sine of the incident angle; for example an acoustic signal coming at right angle to the array will not generate any output signal. The direction signal is similar to the signal output itself with the exception of a phase shift a scaling factor of $2\pi D/\lambda$. For a signal at 1kHz, this corresponds to a ~30 dB as compared to the amplitude signal. Also note that the direction sensing is not limited by two elements. By increasing the number of array elements the signal-to-noise can be improved. It is also possible to arrange the microphones at right angles to each other to determine the angle of incidence in 3 dimensions. An extension of this idea can be applied to detect the particle velocity vector components by placing the microphones on the faces of a cube to obtain the pressure gradients.

Sound Transmission and Self-Calibration

Figure 4:
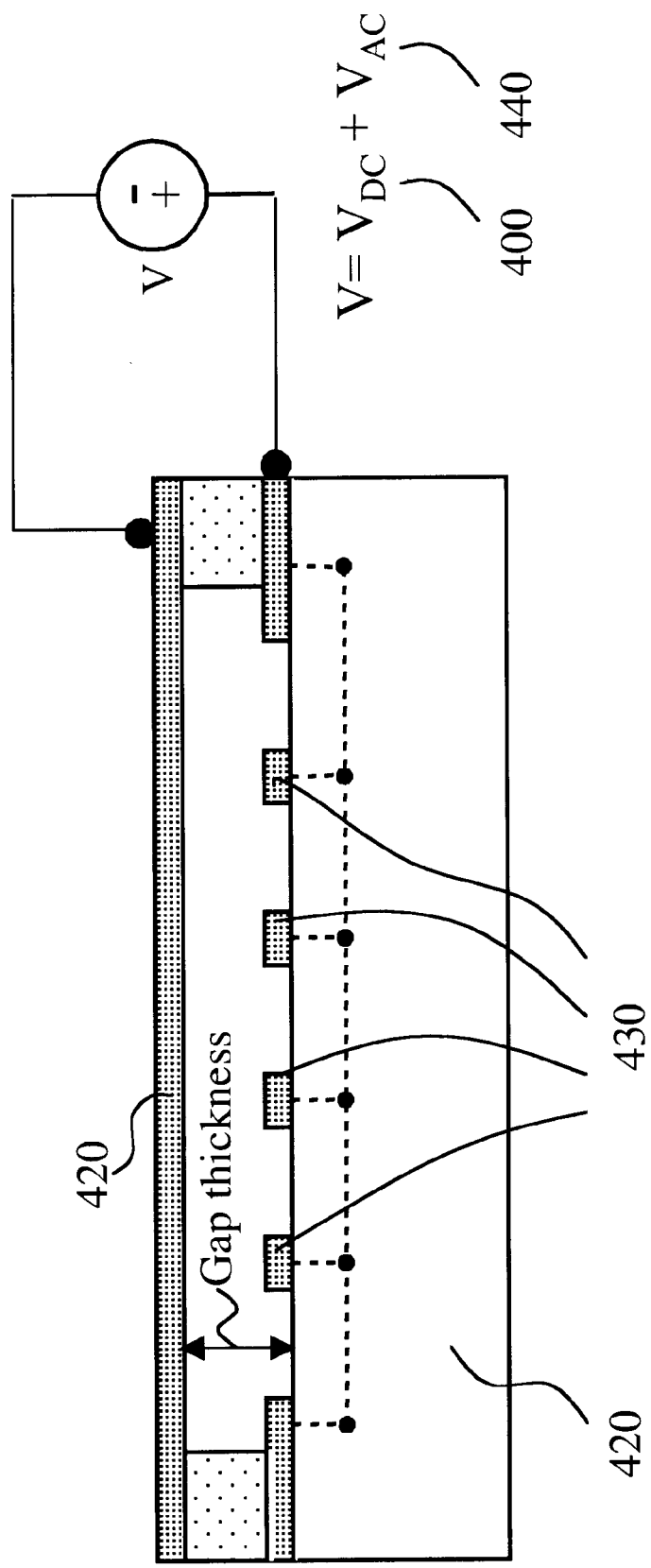
FIG. 4 provides an example of a micro-machined optical displacement sensor used in the transmit or self-calibration mode.

Referring to FIG. 4, in order to operate the optical displacement sensor or more particularly the microphone at the maximum sensitivity and to adjust for the ambient pressure changes, there will be a DC bias voltage 400 applied between reflector or membrane 410 and substrate 420. As shown in FIG. 4, this voltage 400 will be applied by the help of the conductive diffraction grating fingers 430. Adding an AC signal 440 to the bias 400, the microphone can be used as a regular cMUT, which can transmit sound as well as receive acoustic signals.

Transmitting pre-determined acoustic signals from some particular elements through air and deflecting them by the help of a built-in reflecting structure, the receivers can be calibrated. One can also generate acoustic waves propagating in the substrate, which are independent of the surrounding medium, for calibration. Another use of the transmission capability can be the evaporation of the moisture condensed on the surface of the devices by applying large signals and resonating the membranes. This can be thought as a self-cleaning function especially in humid and wet environments. The device is completely covert while acting as a microphone, since the top surface will have a conducting layer. By using this layer as a grounded shield, the device will still be covert during the transmission or self-calibration modes.

Optoelectronics integration

In order to realize a compact microphone using the optical detection scheme of the present invention, a coherent light source that can be integrated to the transparent substrate is needed. It is noted that the light source should be coherent only for a length of two times the gap thickness. This requirement is satisfied by vertical cavity lasers. These lasers have already been fabricated in the form of 1-D and 2-D arrays and they are commercially available.

Device fabrication

The microphone structure of the present invention offers the sensitivity of the optical interferometry in a very small volume. This will be possible through the monolithic integration of the micro-machined mechanical structures with optics due to the recent advances in silicon micromachining and optoelectronics. Several critical parameters involved in the design of the devices justify the micromachining of these structures. The diffraction grating that will be formed on the transparent substrate should have a spatial period in the order of the optical wavelength to have the diffraction orders separated from a small illuminated spot at a short observation distance. The gap thickness should be small enough to be sealed in a vacuum environment and the membrane thickness should be in the order of microns to have the compliance required for the microphone sensitivity. Reasonable DC control voltage levels also require these dimensions to be small.

Fabrication of Membrane and Diffraction Grating

The following description provides an exemplary embodiment on how to fabricate a membrane and diffraction grating. One could fabricate the membranes using PECVD nitride and the diffraction gratings and the top metallization using thin metal film deposition techniques. The process flow involves first the deposition and patterning of metallic fingers using standard photolithography on a transparent substrate such as a quartz wafer. A low temperature PECVD nitride and patterning follows to electrically insulate the fingers from the membrane, to form an antireflection layer. Low stress PECVD nitride have been shown to be feasible to form micromachined 300 $\mu$m×300 $\mu$m square microphone membranes with 0.5 $\mu$m thickness. One could, for instance, use PECVD polysilicon as the sacrificial layer material and an etch channel structure as in the vacuum-sealing of cMUTs. After the membrane is deposited the sacrificial layer is removed to release the membranes and the cavity will be sealed by LTO deposition and patterning. As a final step, the top metal is deposited. The thickness of the membrane and thin layer of silicon nitride on the substrate will be determined as a result of the modeling of mechanical and optical structures Fabrication of Backside Diffraction Grating The devices fabricated using the process described above can be used for initial testing, where an external laser can be directed to the diffraction grating at a desired angle. When the VCSELs are integrated to this structure, the light emitted from the VCSEL wafer will be normal to the grating, sending the zeroth order reflection back to the laser instead of the photodetector. One could solve this problem by forming a transmission diffraction grating at the backside of the substrate to deflect the incoming light to the microphone grating at a suitable angle. Transmission gratings have been used in micro-machined spectrometers. The grating can be formed by wet etching of quartz, and its dimensions are determined by an analysis similar to the reflection gratings.

Most of the current microphones are capacitive microphones. Other approaches in the prior art using piezoelectric or piezoresistive effects suffer from high noise level and low sensitivity, respectively, as well as low bandwidth. Micromachining is a natural way of fabricating capacitive microphones since one can realize compliant membranes to increase the mechanical sensitivity, $S_m$, and a small gap between the electrodes increases the electrical sensitivity, $S_e$. Overall sensitivity of the microphone is then given by $S_m S_e$, which is the dependence of the output signal to the pressure. These quantities are defined as $$S_m = \frac{dx}{dP} \text{ and } S_e = \frac{di}{dx}$$

where x is the membrane displacement and P is the pressure. Writing the output current of a capacitive detector as $$I = \omega_a V_{DC} C \frac{x}{x_0} \Rightarrow S_e = \omega_a V_{DC} C \frac{1}{x_0}$$

where $V_{DC}$ is the DC bias, C is the capacitance and $x_o$ is the gap thickness at rest. One can realize that there are inherent limitations of the capacitive detection scheme by looking at this expression. More signal current is obtained by increasing the DC bias. The maximum DC bias voltage is limited by the collapse voltage of the membrane, which in turn is inversely proportional to the square root of the mechanical sensitivity. Increasing the capacitance C, requires smaller gap thickness x0, which also limits the collapse voltage. Another important point is the fact that $S_e$ depends on the frequency of the acoustic wave, $\omega_a$, which limits the low frequency response of the capacitive microphones. The signal-to-noise is much smaller than one should get with a thermal mechanical noise limited detection scheme.

The sensitivity expression presented above does not take the effect of the air in the gap between the membrane and the back plate into account. At high frequencies, the squeeze film damping in the small gap decreases the sensitivity. One can try to decrease this loss by incorporating acoustic holes in the back plate, decreasing the capacitance area. The open gap structure is required in these schemes. In case of a vacuum-sealed gap, either the membrane would collapse or the membrane should be made stiffer to withstand the atmospheric pressure, decreasing the mechanical sensitivity to very low levels. These microphones are inherently not sensitive at DC and subsonic frequencies due to the open gap structure. The streaming resistance also increases the losses, hence the noise level of the microphones. One should also consider the thermal mechanical noise while evaluating a microphone, which will always be larger for an open gap structure as compared to a vacuum-sealed cavity.

The advantages of the apparatus and method of the present invention can be seen from the expression for the output current $$I = IR\frac{4\pi x}{\lambda} \Rightarrow S_e = IR\frac{4\pi}{\lambda}$$

Note that the sensitivity of the electrical signal is independent of the gap thickness, the frequency of the acoustic wave and the capacitance of the device. This enables one to design and implement vacuum-sealed, microphone membranes with high mechanical sensitivity. The only trade off will be a gain-bandwidth product since a more compliant membrane will have a lower resonance frequency limiting the bandwidth. The output current of the microphone can be estimated by using typical numbers for the photodetector, light intensity and wavelength. For the particular membrane, and assuming I=50 $\mu$W, R=0.5 A/W, and using a HeNe laser, one obtains an output current of 5mA/Pa. For the same membrane, the capacitive detection scheme has a current output of 12.5 µA/Pa at 100kHz when operated at its collapse voltage of 40V. This shows that at 100 kHz, the scheme of the present invention should generate nearly 400 times more signal. Also, note that the current level of the optical detection scheme is constant with frequency whereas the capacitive method decreases with frequency.

The noise performance of the apparatus and method of the present invention is dominated by the detector noise as described earlier. Calculations indicate that by spatial averaging the noise level of the detection scheme can be reduced below the thermal mechanical noise limit. It is also noted that the VCSELs that will be used in the optoelectronics integration can be modulated up to several GHz. By modulating the light input incident at the diffraction grating, one can modulate the output signal and amplify it without the 1/f noise before it is demodulated to obtain the final output signal.

The method will ease the integration of the capacitive micromachined ultrasonic transducers with electronics. These transducers require high voltage levels in transmission and very low voltage levels are generated during reception. It is difficult to combine electronics having a large voltage swing capability and low noise characteristics on a single chip. Using the optical apparatus and method of the present invention, for reception one can include the optimized low noise electronics on one chip while using the optimum transmitter circuitry on a separate chip to drive the cMUTs.

The detection method is a general method, which is amenable for integration with many different sensors. Most of the current micromachined capacitive microphones can be modified to integrate the detection apparatus and method of the present invention.

The substrate carrying the n on-moving diffraction grating should be transparent to the light incident from the backside. Although it is proposed to use quartz or any type of glass as the substrate, many different materials can be used with a light source at an appropriate wavelength. For example, silicon can be used as a substrate with a laser with 1.3 µm wavelength. To improve light transmission at the substrate-air interfaces, suitable anti-reflection layers can be deposited on the substrate. Any material, which can be lithographically defined and etched by a micromachining process, can be used to form the gratings and the membrane given that they have suitable mechanical and optical parameters. To eliminate 1/f noise the laser intensity can be modulated or the membrane can be vibrated at a frequency, which is much higher than the frequency of the signal of interest.

Although the optical detection apparatus and method is described using a microphone membrane as an example, the method can be used to detect vibrations and displacement on any flat surface which is substantially close and parallel to the transparent substrate carrying the reference diffraction grating and which reflects the incident light at a significant level. By simply changing the membrane with such a surface one can use the sensor to detect the out of plane motion due to acoustic waves propagating on a surface. This surface can be the top surface of a solid plate or a halfspace. Using an array of these sensors on a single wafer, one can easily make measurements of wave velocity and mapping of acoustic fields.

Another important application of the apparatus and method of the present invention would be in the area of scanning probe microscopy and lithography, where the displacement of a 1-D or 2-D array of AFM cantilevers has to be monitored while the array is being scanned at high speeds. The interdigital cantilevers are designed for this purpose, but their poor mechanical stability is a problem at high scanning speeds. The apparatus and method of the present invention can be easily implemented in the form of 1-D or 2-D arrays and used with regular AFM cantilevers for high speed imaging and lithography. The detector wafers can be aligned with the cantilever array wafer and bonded as part of the fabrication process. In case of a single cantilever system, the compact detector can be moved by piezo actuators to align it to the cantilever surface.

Yet another important application of the apparatus and method of the present invention would be in optical communications or multiplexing, where various signals are transmitted through the same optical fiber simultaneously at different wavelengths, a method called wavelength division multiplexing (WDM). An array of reflective membranes, each separated from the transparent substrate and the grating by an electrically controlled separation can be used to couple electrical signals to optical fibers at different wavelengths. The present invention in a sensor array application also includes using a different wavelength to monitor the displacement of each membrane where the membrane position is changed by an external physical or chemical input. For this purpose, each membrane in the array is illuminated by a laser of different wavelength (such as tunable VCSELS) through the non-moving fingers. Then the communication or sensor signals to be multiplexed can be used to adjust the gap between each membrane and the substrate to control the intensity of the reflected diffraction orders in an analog or digital manner. This is similar to a calibration signal generation in the microphone application. Moreover, the position of the diffracted orders for each wavelength can be adjusted by the geometry of the diffraction grating on the substrate. For example, the position of these orders can be made the same for different wavelengths to couple light efficiently to a single optical fiber for WDM.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed is:

1. An optical displacement sensor for measuring vertical displacement of a reflector, comprising:
   (a) an optically transparent substrate;
   (b) a reflective grating deposited on said substrate;
   (c) a light source to provide optical illumination on said reflector through said substrate and said reflective grating;
   (d) said reflector positioned at a vertical distance that is substantially less than half the coherence length of said light source over and with respect to said substrate and said reflective grating, and said reflector positioned substantially parallel to said substrate and said reflective grating;
   (e) one or more photo-detectors to monitor reflected and diffracted light from said reflector and said reflective grating; and
   (f) a wafer with at least one aperture for light transmission from said light source and said wafer comprises said one or more photo-detectors.

2. The optical displacement sensor as set forth in claim 1, wherein said reflector is a flexible and optically reflective membrane.

3. The optical displacement sensor as set forth in claim 1, wherein said reflective grating is formed by non-moving fingers.

4. The optical displacement sensor as set forth in claim 1, wherein said light source is a coherent light source.

5. The optical displacement sensor as set forth in claim 4, wherein said coherent light source is a semiconductor laser.

6. The optical displacement sensor as set forth in claim 4, wherein said coherent light source comprises an optical fiber.

7. The optical displacement sensor as set forth in claim 1, wherein said one or more photodetectors comprise one or more optical fibers.

8. The optical displacement sensor as set forth in claim 1, wherein said substrate is transparent at a selected wavelength of said optical illumination.

9. The optical displacement sensor as set forth in claim 1, further comprising at least one DC bias voltage applied between said substrate and said reflector adjusting said vertical position of said reflector to a desired location.

10. The optical displacement sensor as set forth in claim 9, wherein said at least one DC voltage is applied to non-moving fingers of said reflective grating.

11. The optical displacement sensor as set forth in claim 9, wherein an AC signal is added to said at least one DC bias voltage for calibration of said optical displacement sensor.

12. The optical displacement sensor as set forth in claim 1, wherein said wafer further comprises one or more amplifiers.

13. The optical displacement sensor as set forth in claim 1, further comprising an array of reflectors with at least one other reflector positioned at a vertical distance that is substantially less than half the coherence length of said light source positioned over and with respect to at least one other reflective grating and said substrate.

14. The optical displacement sensor as set forth in claim 13, further comprising a transmission grating to deflect said optical illumination to said array of reflectors with at least one other reflector and to at least one other reflective grating.

15. The optical displacement sensor as set forth in claim 13, wherein each element in said array of reflectors is illuminated at a separate wavelength and multiplexed to a single optical fiber.

16. A method of measuring vertical displacement of a reflector with an optical displacement sensor, comprising the steps of:

(a) providing an optically transparent substrate;

(b) providing a reflective grating deposited on said substrate;

(c) optically illuminating said reflector through said substrate and said reflective grating with a light source;

(d) positioning said reflector at a vertical distance that is substantially less than half the coherence length of said light source over and with respect to said substrate and said reflective grating, and positioning said reflector substantially parallel to said substrate and said reflective grating;

(e) monitoring diffracted and reflected light from said reflector and said reflective grating with one or more photo-detectors;

(f) providing a wafer with at least one aperture for light transmission from said light source and said wafer comprises said one or more photo-detectors.

17. The method as set forth in claim 16, wherein said reflector is a flexible and optically reflective membrane.

18. The method as set forth in claim 16, wherein said reflective grating is formed by non-moving fingers.

19. The method as set forth in claim 16, wherein said step of optically illuminating comprises the step of providing a coherent light source.

20. The method as set forth in claim 19, wherein said coherent light source is a semiconductor laser.

21. The method as set forth in claim 19, wherein said coherent light source comprises an optical fiber.

22. The method as set forth in claim 16, wherein said one or more photodetectors comprise one or more optical fibers.

23. The method as set forth in claim 16, wherein said substrate is transparent at a selected wavelength of said optical illumination.

24. The method as set forth in claim 16, further comprising at least one DC bias voltage applied between said substrate and said reflector adjusting said vertical position of said reflector to a desired location.

25. The method as set forth in claim 16, wherein said at least one DC voltage is applied to non-moving fingers of said reflective grating.

26. The method as set forth in claim 25, wherein said at least one DC bias voltage comprises an AC signal for calibration of said optical displacement sensor.

27. The method as set forth in claim 16, wherein said wafer further comprises one or more amplifiers.

28. The method as set forth in claim 16, further comprising the step of providing an array of reflectors with at least one other reflector, positioned at a vertical distance that is substantially less than half the coherence length of said light source, over and with respect to at least one other reflective grating and said substrate.

29. The method as set forth in claim 28, further comprising the step of providing a transmission grating to deflect said optical illumination to said array of reflectors with at least one other reflector and to at least one other reflective grating.

30. The method as set forth in claim 28, wherein each element in said array of reflectors is illuminated at a separate wavelength and multiplexed to a single optical fiber.

* * * * *